United States Patent
Hagerman

(10) Patent No.: US 6,973,568 B2
(45) Date of Patent: *Dec. 6, 2005

(54) APPARATUS AND METHOD FOR IMPLEMENTING SPOOFING-AND REPLAY-ATTACK-RESISTANT VIRTUAL ZONES ON STORAGE AREA NETWORKS

(75) Inventor: Douglas L. Hagerman, Shrewsbury, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/945,644

(22) Filed: Sep. 21, 2004

(65) Prior Publication Data

US 2005/0044354 A1    Feb. 24, 2005

Related U.S. Application Data

(63) Continuation of application No. 09/680,740, filed on Oct. 6, 2000, now Pat. No. 6,823,453.

(51) Int. Cl.$^7$ ............................ H04L 9/00; G06F 15/16
(52) U.S. Cl. ................ 713/153; 713/154; 713/160; 713/168; 380/259; 709/247
(58) Field of Search ............................... 713/153, 154, 713/176, 179, 181; 380/261, 262

(56) References Cited

U.S. PATENT DOCUMENTS

| | | | | |
|---|---|---|---|---|
| 5,511,122 A | * | 4/1996 | Atkinson | 713/153 |
| 5,841,978 A | * | 11/1998 | Rhoads | 709/217 |
| 5,870,474 A | * | 2/1999 | Wasilewski et al. | 380/211 |
| 5,878,141 A | * | 3/1999 | Daly et al. | 705/78 |
| 6,240,513 B1 | * | 5/2001 | Friedman et al. | 713/152 |
| 6,438,612 B1 | * | 8/2002 | Ylonen et al. | 709/249 |
| 6,442,571 B1 | * | 8/2002 | Haff et al. | 707/201 |
| 6,493,825 B1 | * | 12/2002 | Blumenau et al. | 713/168 |
| 6,577,630 B1 | * | 6/2003 | Markwalter et al. | 370/392 |
| 6,650,761 B1 | * | 11/2003 | Rodriguez et al. | 382/100 |
| 6,714,979 B1 | * | 3/2004 | Brandt et al. | 709/225 |
| 6,801,999 B1 | * | 10/2004 | Venkatesan et al. | 713/167 |
| 6,823,453 B1 | * | 11/2004 | Hagerman | 713/162 |

OTHER PUBLICATIONS

"Brocade Zoning" Copyright © by Brocade Communications Systems, Inc., 3 pages.
Capellix ™3000 Modular SAN Switch, Copyright © Gadzoox Networks Inc., 7 pages.

* cited by examiner

*Primary Examiner*—Kambiz Zand

(57) ABSTRACT

A storage area network resistant to spoofing attack has several nodes each having a port, and storage area network interconnect interconnecting the ports. Each port is provided with a hash function generator for providing and verifying an authentication code for frames transmitted over the storage area network, and a key table for providing a key to the hash function generator. The authentication code is generated by applying a hash function to the key and to at least an address portion of each frame. In each node, the key is selected from that node's key table according to address information of the frame.

13 Claims, 6 Drawing Sheets

SPOOFING RESISTANT FRAME STRUCTURE

PRIOR ART    FRAME STRUCTURE

APPARATUS AND METHOD FOR IMPLEMENTING SPOOFING-AND REPLAY-ATTACK-RESISTANT VIRTUAL ZONES ON STORAGE AREA NETWORKS

This application is a continuation of U.S. patent application Ser. No. 09/680,740, filed Oct. 6, 2000, now U.S. Pat. No. 6,823,453, the disclosure of which is incorporated herein by reference.

FIELD OF THE INVENTION

The invention relates to the field of storage area networking, with emphasis on Fibre Channel networks. In particular the invention relates to spoofing and replay attack-resistant, zoned, Fibre Channel networks.

BACKGROUND OF THE INVENTION

Most modern computer networks, including switched Fibre Channel networks, are packet oriented. In these networks, data transmitted between machines is divided into chunks of size no greater than a predetermined maximum. Each chunk is packaged with a header and a trailer into a packet for transmission. In Fibre Channel networks, packets are known as Frames. Fibre Channel frames may encapsulate a block-oriented protocol operating at a higher level.

A Fibre Channel network having at least one switch is a switched Fibre Channel fabric. A Fibre Channel switch is a routing device generally capable of receiving frames, storing them, decoding destination information from headers, and forwarding them to their destination or another switch further along a path toward their destination. A network interface for connection of a machine to a Fibre Channel fabric is known as an N-port, and a machine attached to a Fibre Channel network is known as a node. Nodes may be computers, or may be storage devices such as RAID systems. An NL-Port is an N-port that supports additional arbitration required so that it may be connected either to a Fibre Channel Fabric or to a Fibre Channel Arbitrated Loop.

Fibre Channel switched-fabric networks are often used to implement storage area networks. Storage Area Networks (SANs) are characterized as high-speed networks primarily conveying data between storage nodes and compute nodes, often utilizing separate network hardware from that used for general-purpose network functions.

Fibre Channel SAN traffic may include traffic utilizing the SCSI peripheral interconnection protocol encapsulated within Fibre Channel frames. SCSI over Fibre Channel typically requires that frames be delivered in-order and without duplication.

Compute nodes of storage area networks typically run an operating system that assumes that some or all storage is local to the compute node, or at least is private to that node. This storage is assumed to be "owned" by that node. Should that storage be accessed from another node, unpredictable results may occur.

It is sometimes desirable to configure a Fibre Channel SAN such that ports are grouped into zones, which may or may not overlap. A zoned configuration may restrict access to a particular storage node to only a subset of the compute nodes of the SAN. Similarly, a zoned configuration may restrict traffic to a particular compute node to that from specific storage nodes. These restrictions may be of use in enforcing security policies, and controlling ownership of storage resources.

Some extant Fibre Channel zoning systems, including some available from Brocade Communications Systems, implement zoning at the switch level. In these implementations, frame headers are decoded by each switch. A source and a destination identifier in the frame header are used to determine whether the frame will be forwarded to its intended destination. Frames having source and destination identifiers outside any permitted zone are dropped, thereby restricting traffic to within authorized zones.

It is known that message authentication on general purpose networks may be done by computing an authentication code based upon the message data and a key value known to both the machine originating and the machine receiving the message. This method may, however, be fooled by duplicated and retransmitted messages.

Tunneling is a technology whereby frames of transactions between a first node of a first network and a first node of a second network are encapsulated, often encrypted, and transmitted over a third network linking the first two networks. The encryption, encapsulation, and de-encapsulation are often performed by a second node of the first network and a second node of the second network.

A recent trend in networked systems is to store some or all data used by a first party's system on a machine that may be owned by a different party. With Compaq's Private Storage Utility, data belonging to a customer may reside on a storage system owned, operated, and maintained by a hosting company such as Compaq. Such a storage system may be a Fibre Channel node.

When a hosting company owns and operates a storage system to store customer's data, it may be desirable to manage the storage system from a remote location. This is remote storage system management.

Remote storage system management may be accomplished through tunneling. This provides advantage in that many management functions may be achieved without travel expense.

DESCRIPTION OF THE PROBLEM

Spoofing is the accidental or intentional injection of false messages into a system or network. These false messages have the potential to cause disruption of operation or corruption of data with potentially serious consequences.

False messages can be injected into a network by accidental corruption of valid messages. For example, diagnostic software may capture valid frames. Entire, albeit shorter than maximum length, captured frames may then be encapsulated in larger frames transmitted over the network for storage or analysis. Should the header of the larger frame be dropped, the encapsulated short frame may be misinterpreted as a valid frame and trigger unintended operation. Similarly, corruption of a destination address in a frame may cause that frame to be routed to an incorrect destination, where misdelivered frames can cause unwanted effects. Similarly, it is possible for a malfunctioning fabric (or a malicious intruder) to cause one or more frames to be replayed, or delivered more than once, the second delivery potentially causing undesired effects.

Spoofing may involve intentional injection of false messages. Frames may be injected that command reformatting, deletion, or changes to drives or partitions, alterations to network parameters including zoning, changes to passwords or security settings, and so on. These injected frames may be followed by other attacks aimed at reading data, including data for which the false frames may have altered security settings.

In the Fibre Channel context, it is conceivable that a malicious, faulty, or improperly configured, node may generate one or more frames having source identifier (S_ID) fields that do not accurately reflect the identity of the node. Since many zoned Fibre Channel fabrics deliver frames based exclusively on the source identifier (S_ID) and destination identifier (D_ID) fields of the frame, it is possible for malicious nodes to send spoof frames to other nodes of the network. With switch-based zoning, this possibility exists even if the malicious nodes are not part of the same zone as the recipient nodes.

It is desirable to prevent spoofing in a zoned storage area network. It is desirable that spoofing be prevented in such a way that undesirable activity caused by duplicate frames is prevented.

Further, consider remote system management. It is desirable that the possibility of spoofing be eliminated in a way that prevents damage due to spoof frames originating in networks that tunnel to the zoned storage area network.

SOLUTION TO THE PROBLEM

A Fibre Channel storage area network utilizes frames having time-of-transmission and authentication-code fields. These fields are in addition to the normal fields of Fibre Channel frame headers, and may be implemented as a higher-level protocol encapsulated in the data portion of each frame or may be embedded in an enhanced frame header. The time-of-transmission field is derived from a real-time clock on each node. The real-time clock is incremented quickly enough that no two frames transmitted within a reasonable time of each other will have the same time-of-transmission field contents.

Each node of a zone participating in an exchange is assigned a key value, which may be unique to the exchange and is known to both the originating and receiving nodes of the exchange. This key value is used, along with the contents of the time-of-transmission field and other fields of the frame, to compute an authentication code that is transmitted in the authentication-code field of the transmitted frame. In a particular embodiment, the authentication code is computed using the MD2 hashing algorithm.

Key values are maintained in a table on each node of the storage area network. This table preferably contains unique key values for each node pair of the SAN between which communications are permitted, although a unique key value shared by a group of machines is operable.

Each node that receives the transmitted frame recomputes the authentication code based upon a key selected from the table according to the S_ID of the frame header. The recomputed authentication code is compared to that in the frame, those frames having mismatched authentication codes are dropped.

Similarly, frames having time-of-transmission fields indicating that they were not received within a reasonable time, or which duplicate recently received time-of-transmission fields, are also dropped. Consideration of the time-of-transmission prevents duplicate frames from causing problems.

This solution is believed capable of providing a degree of resistance to spoofing attacks launched over tunneling connections to the storage area network as well as those originating on the storage area network.

SUMMARY OF THE INVENTION

The foregoing and other features, utilities and advantages of the invention will be apparent from the following more particular description of a preferred embodiment of the invention as illustrated in the accompanying drawings.

DETAILED DESCRIPTION

Figure 1:
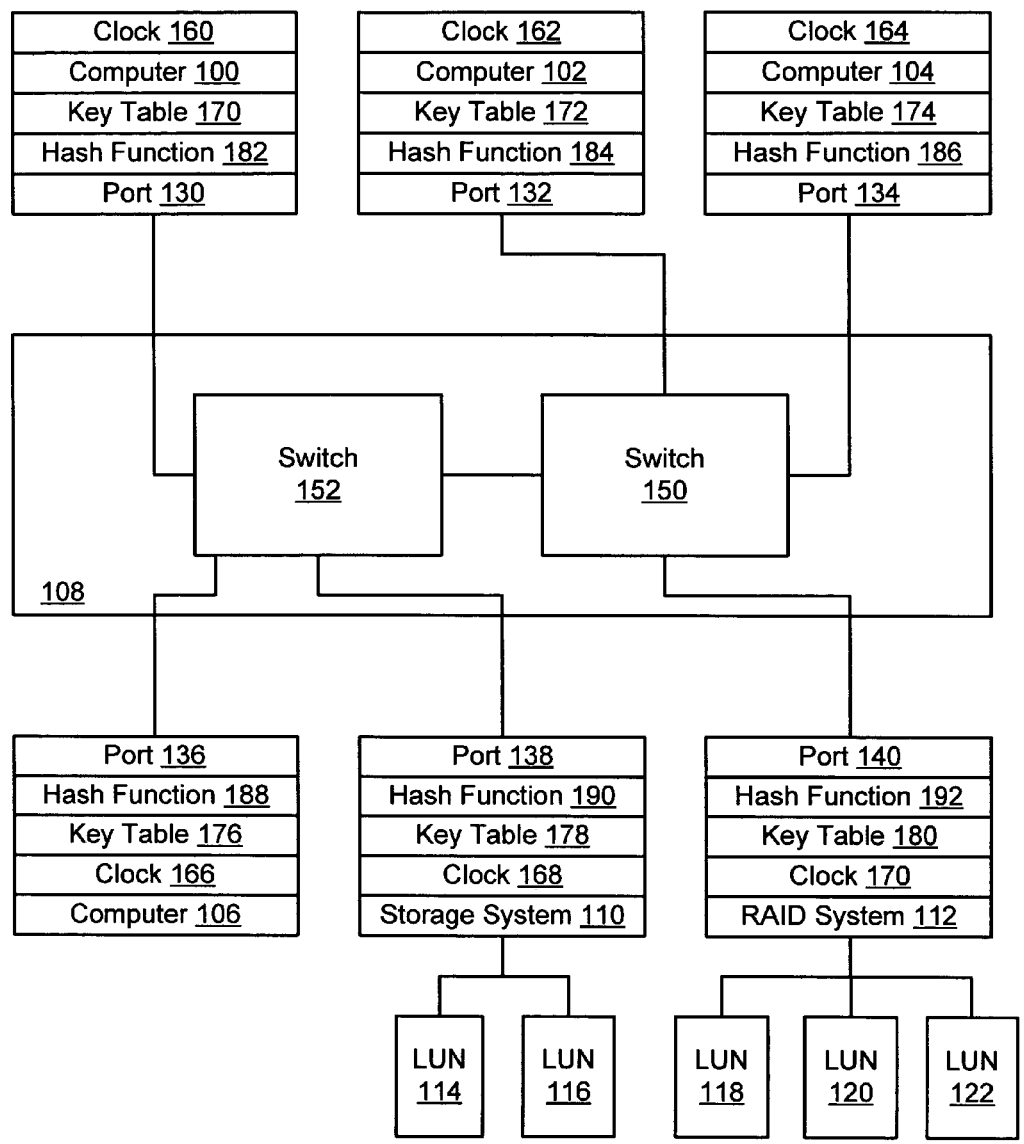
FIG. 1 is a diagram of a zoned Fibre Channel network.

A storage area network (FIG. 1) has several computers 100, 102, 104, and 106 coupled through a Fibre Channel network interconnect 108 to a storage system 110 and a RAID system 112. Storage system 110 provides logical units 114 and 116, and RAID system 112 provides logical units 118, 120, and 122 to the network. Each computer, storage system, and RAID system communicates with the network interconnect 108 through a port 130, 132, 134, 136, 138, and 140.

It is desired to implement zoning in the network such that computer 100 has access to storage system 110 logical unit 114, but computer 102 is restricted from accessing storage system 110 logical unit 114.

Figure 2:
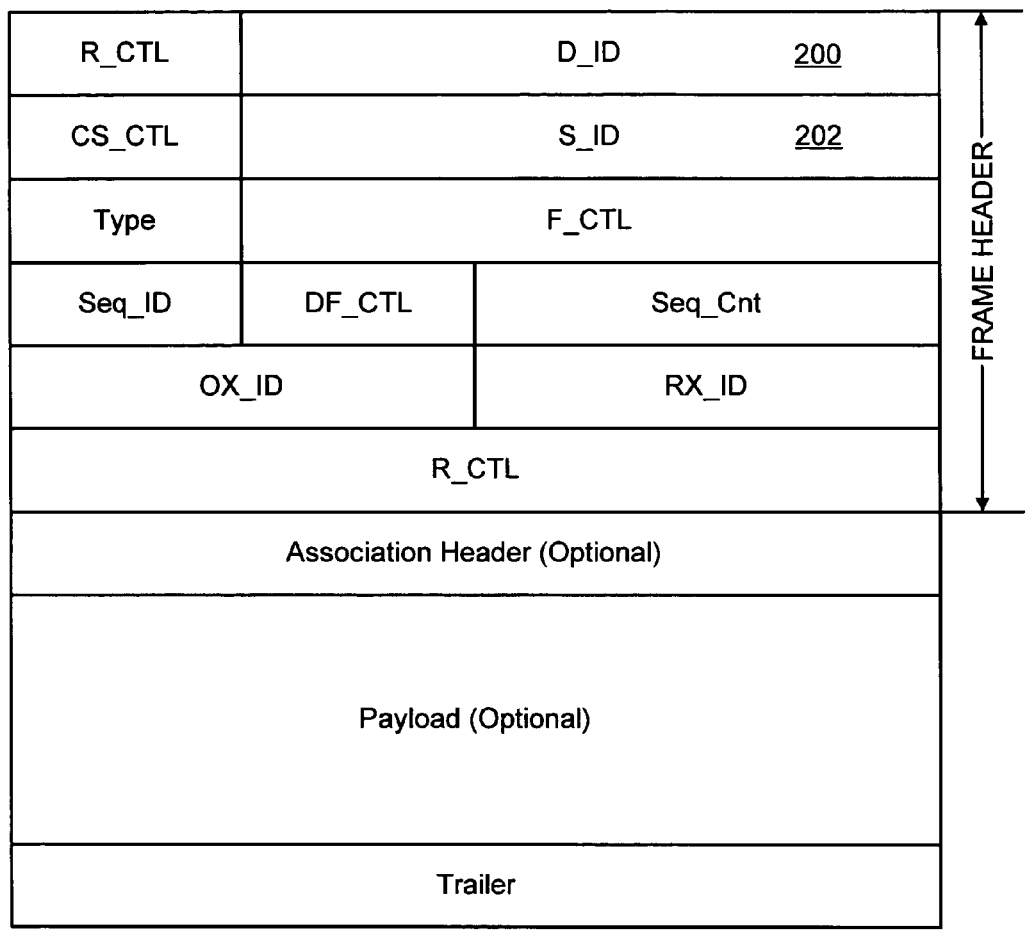
FIG. 2, an illustration of a prior-art Fibre Channel frame format, showing presently-defined fields of the header.

The computers, storage systems, and RAID system communicate over the network by transmitting frames, having format as illustrated in FIG. 2. Each frame has a header comprising a destination identifier (D_ID) field 200, and source identifier( S_ID) field 202. Each frame may also have an association header 204 for specifying specific processes at source and destination; it is known that association headers may be used to specify a particular logical unit relevant to the frame. It is known that some current protocols for embedding SCSI device commands in Fibre Channel frames specify logical units in commands embedded in the data portion of the frame. The S_ID and D_ID fields correspond to source and destination port addresses. Some computers, storage systems, and RAID systems may have multiple ports, each with its own address, to improve bandwidth.

With switch-based zoning as known in the art, Fibre Channel interconnect 108 must be a switched fabric comprising one or more switches 150. Each frame is inspected to verify that the source specified in the S_ID field 202 is permitted to communicate with the destination specified in the D_ID field 200; frames not meeting this requirement are discarded at the switch. For example, switches 150 can be programmed to pass frames having S_ID and D_ID claiming that they are from computer 100 port 130 to reach storage system 110 port 138, but block frames having S_ID and D_ID claiming that they are from computer 102 port 132 and addressed to storage system 100 port 138. Such switch-based zoning restricts communications on the basis of port identity.

A frame originating at computer 102 and transmitted through port 132 having a S_ID corresponding to computer 100 and port 130 would not be blocked in the forgoing example—this is an example of a spoof frame.

Figure 3:
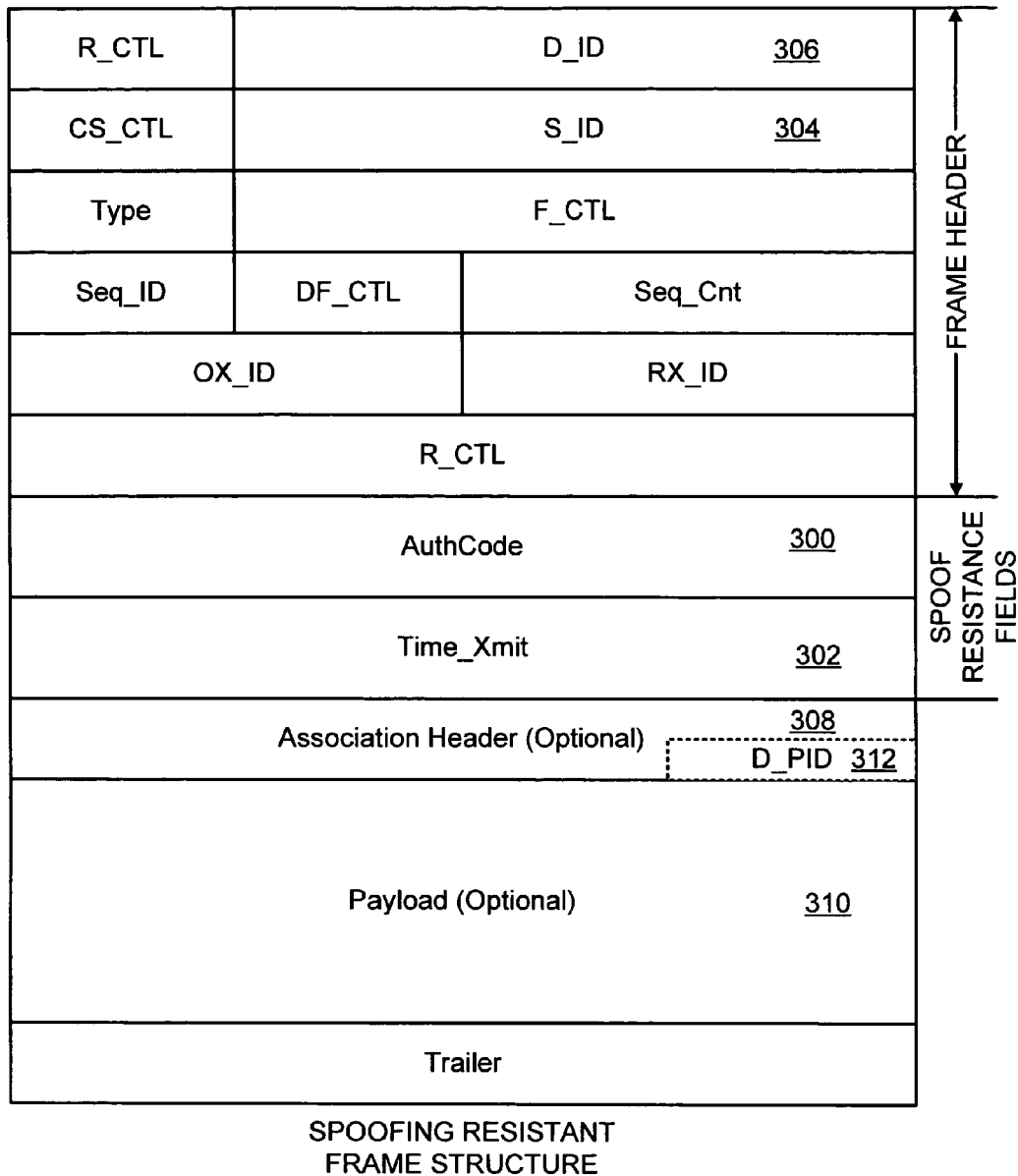
FIG. 3, an illustration of a frame format of the present invention, showing the additional fields of the invention.

In a computer network of the present invention, each computer 100, 102, 104, 106, storage system 110, and RAID system 112 is provided with a real time clock 160, 162, 164, 166, 168, and 170 respectively. Each port is modified to transmit frames having the modified format of FIG. 3, where each frame has an authentication code field 300 and a transmitted time field 302, along with the standard S_ID field 304 and D_ID field 306. The time field incorporates a time read from the real time clock associated with the transmitting port and has sufficient resolution that no two adjacent frames sent by the same port will have the same time field contents.

The Authentication code field 300 is filled with a hash function of at least a key value, the transmitted time field 302, the S_ID field 304, the D_ID field 306, and any association header field 308. The hash function that generates authentication code field 300 may also operate upon additional fields of the header and payload, security is enhanced by including the payload 310. It is preferable that the hash function be computed by hardware associated with each port, such as hash function generators 182, 184, 186, 188, 190, and 192 (FIG. 1). Software hash function generators may consume considerable compute resources.

The key value used to compute the authentication code field 300 is extracted from a key table 170, 172, 174, 176, 178, and 180 associated with each port. These key tables may be, and often are, dissimilar from port to port, for example key table 170 need not be the same as key table 172. The key tables are initialized such that the key table associated with a given port contains keys for communication with the ports that the given port is authorized to communicate with. For example, if port 130 is authorized to communicate through port 138 and storage system 110 to logical unit 114, key table 170 associated with port 130 and key table 178 associated with port 138 will have at least one common key for port 138—port 130 communications. If port 132 is not authorized to communicate with port 138, then key table 172 and key table 178 will not have a common key for port 132—port 138 communications.

Figure 4:
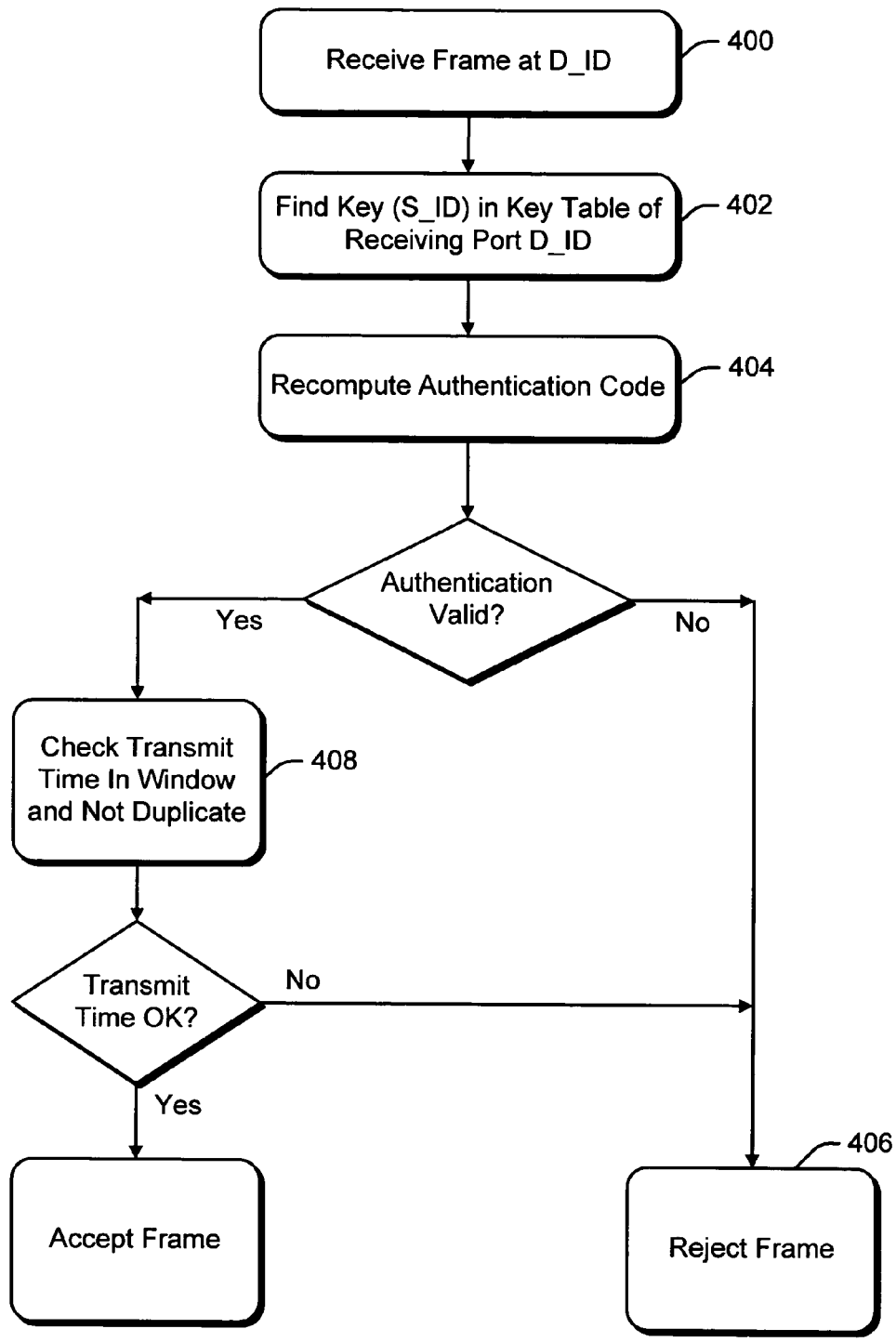
FIG. 4, an flowchart of actions taken by a port upon receiving a frame when enforcing zones to ports according to the present invention.
Figure 5:
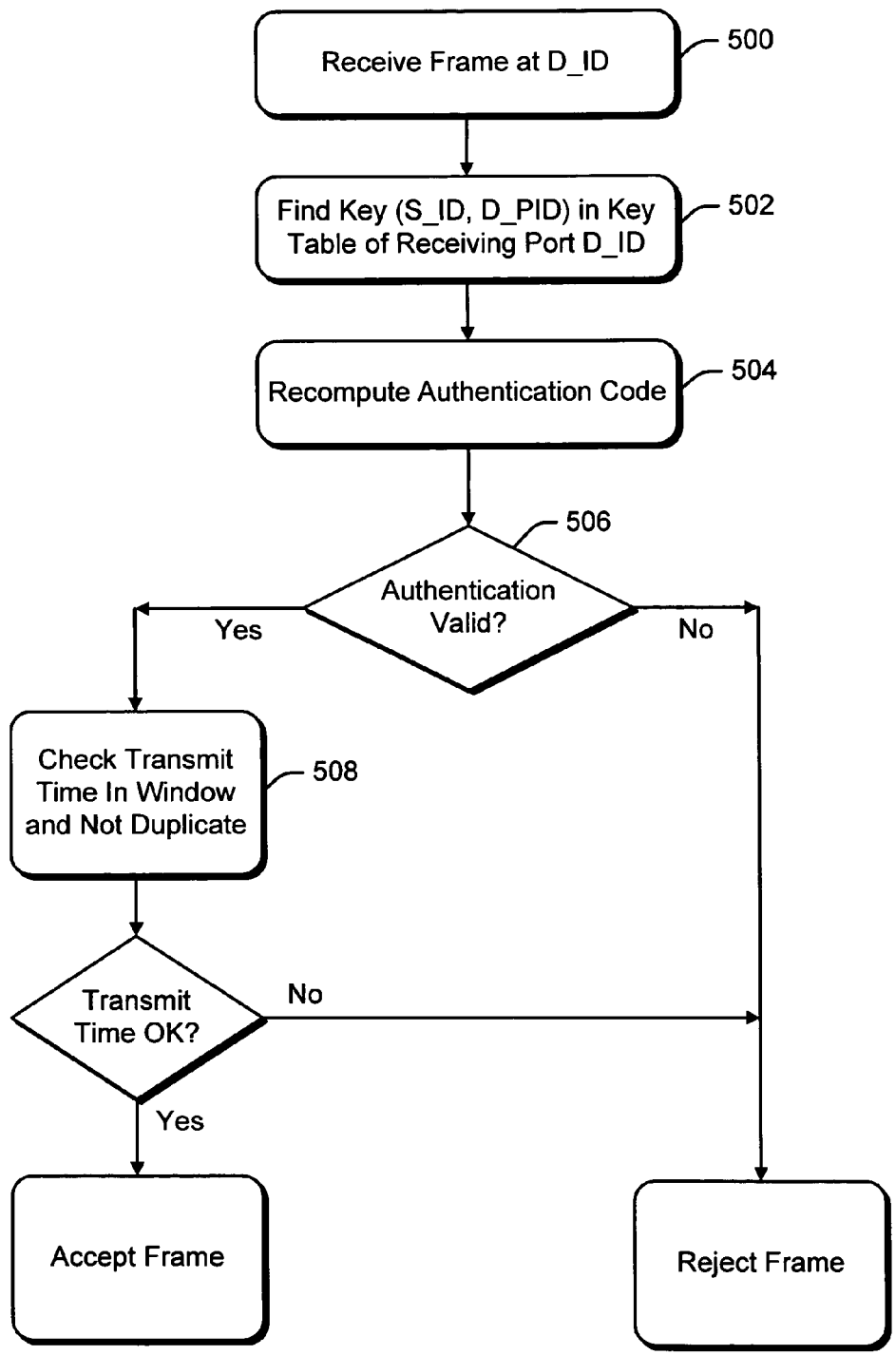
FIG. 5, an flowchart of actions taken by a port upon receiving a frame when enforcing zones to logical units according to the present invention.

Each time a frame is transmitted, the authentication code 300 (FIG. 3) is computed from the key for communication between the designated ports as known to the sending port and the other fields of the frame, and transmitted with the frame. Each time a frame is received, 400 (FIG. 4), the appropriate key for communication between the designated ports is located 402 in the key table of the receiving port. The authentication code is recomputed 404 from the key and the fields of the frame, and verified against the received authentication code 300. Received frames that can not be verified are rejected 406. In this way, computer 100 and port 130 (FIG. 1) may be given common keys with, and thereby permitted to communicate with, port 138 and storage system 110; while computer 102 and port 132 may be blocked from communicating, or assigned to a different zone.

In order to further improve resistance to spoof frames, each port that receives a frame checks 408 the transmit time 302 of the transmitted frame for duplication and for reasonableness. Since frames that have been captured and reinjected into the network, or accidentally delivered in duplicate, have identical transmit times, second receipt of such frames will be blocked by this duplication test. The reasonableness test examines the difference between the transmit time 302 of a newly received frame and the transmit time 302 of a previously received valid frame to verify that the frame is within a window of acceptable times.

Frames sent from the storage system to a computer are similarly equipped with an authentication code 300 generated from a key extracted from the storage system's key table, and verified by recomputation of the authentication code at the receiving machine.

In this way, ports may be assigned to zones, or potentially overlapping groups of ports, that are permitted to communicate with each other. Assignment is accomplished by provision of appropriate keys to the various key tables of the network. Further, while the interconnect 108 may be a switched fabric as illustrated, the storage area network can function without switches, and may be implemented with Fibre Channel arbitrated loop technology.

It is known that each association header, such as association header 308, contains identification of a process on the receiving system (D_PID) 312 that should receive the frame. For example, a first process of storage unit 110 may be associated with logical unit 114 and a second process with logical unit 116.

In an alternative embodiment, the D_PID 312 of the association header 308 is combined with the appropriate D_ID field to select a key from the originating key table 170. Upon receipt 500 of the frame, the receiving port extracts 502 a key from its key table 178 based upon the D_PID and S_ID fields, and recomputes 504 and verifies 506 the authentication code 300. The receiving port also checks 508 that the transmit time is within the window of acceptable times and is not a duplicate time before accepting 510 the frame. In this way, computer 100 may be given a key for its key table 170 that will match a key of the key table 178 of storage system 110 associated with a process for controlling logical unit 114 but which is invalid for communicating with a process for controlling logical unit 116.

Logical units may therefore be assigned to zones, or potentially overlapping groups of ports and logical units, that are permitted to communicate with each other; while ports and units not within legal zones are prevented from communicating. Therefore, keys can be generated such that computer 100 may be permitted to communicate through port 130, port 138, storage system 110, to logical unit 114, but attempts to communicate with logical unit 116 are blocked. Computer 106 may be similarly permitted access through to logical unit 116, but attempts to reference logical unit 114 are blocked. Similarly, individual logical units, such as LUN 118, of raid system 113 may be permitted communications with one or more computers, such as computer 102 and 104, while communications from those logical units with other computers are blocked.

Yet another embodiment of the invention utilizes SCSI commands encapsulated in Fibre Channel frames for control of specific logical units and devices. These commands contain logical unit numbers (LUNs) encapsulated in the frame in the manner known in the art. In this embodiment, the logical unit number LUN specified is combined with the D_ID field to select a key from the originating key table 170. Upon receipt 500 of the frame, the receiving port extracts 502 a key from its key table 178 based upon the LUN and S_ID fields, and recomputes 504 and verifies 506 the authentication code 300. The receiving port also checks 508 that the transmit time is within the window of acceptable times and is not a duplicate time before accepting 510 the frame. In this way, computer 100 may be given a key for its key table 170 that will match a key of the key table 178 of storage system 110 associated with a particular logical unit 114 but which is invalid for communicating with a process for controlling logical unit 116.

While the forgoing description has revolved about keys known to both nodes, these keys may be distributed at run time through any suitable key distribution algorithm. Key distribution may be accomplished through any of several key distribution algorithms, including by way of example and not by way of limitation the Extensible Authentication Protocol (EAP), using asymmetric-key or public-key encoded certificates. Such asymmetric-key encoded certificates may, by way of example and not of limitation, be encoded with the RSA algorithm.

Figure 6:
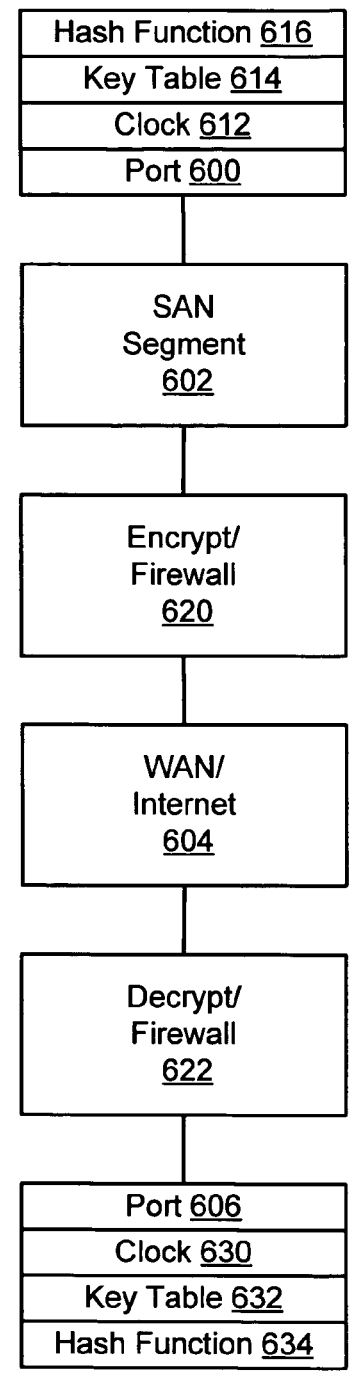
FIG. 6, an illustration of how frames may tunnel between storage area network segments while enforcing zones according to the present invention.

Authentication of storage area network frames according to the present invention may also operate in a tunneling environment. For example, a first port 600 (FIG. 6) of a first SAN segment 602 may desire to transmit a frame through a wide area network (WAN) 604, which may be the Internet, to a second port 606 on a second SAN segment 608. The first port 600 reads its clock 612 and places a time based upon clock 612 in the transmit time field 302 of the transmitted frame. It then looks up an appropriate key for communications with port 606 in its key table 614 and uses a hash function generator 616 to generate an authentication code 300 from the transmit time field 302, the S_ID field 304, the D_ID field 306, association header 308, and payload 310. The entire frame with authentication code 300 is transmitted over the first SAN segment 602 to a firewall 620 where it is encrypted and encapsulated in packets suitable for transmission on the WAN 604. These packets are received at a second firewall 622 where they are decrypted and de-encapsulated for transmission over the second SAN segment 608 to receiving port 606. Port 606 then verifies the reasonableness of the transmit time 302 of the frame and reads a key from its key table 630. This key is then used with the receiving port's hash function generator 634 to verify the authentication code of the transmitted frame.

The hash function generators of the present invention may apply any hash function of reasonable complexity as known in the art. It is anticipated that the MD2 block hash function developed by Ron Rivest in 1989 is particularly suitable for use. The transmit time and authentication code fields may be of different sizes in different applications, however it is anticipated that sixteen bytes of authentication code and eight bytes of transmit time are ample for reasonable security and reliability.

Each node may use a single hash function generator and key table for generating and verifying authentication codes, or may have separate function generators and key tables for generation and verification of frames. For purposes of this application, such implementations are equivalent.

While the invention has been particularly shown and described with reference to a preferred embodiment thereof, it will be understood by those skilled in the art that various other changes in the form and details may be made without departing from the spirit and scope of the invention.

What is claimed is:

1. A method of transmitting data from a transmitting node to a receiving node in a computer-based storage network, comprising:
   at the transmitting node:
      generating a data frame at the transmitting node;
      inserting a source identifier, a destination identifier, and a transmission time stamp into the data frame;
      computing a first authentication code using a first key value retrieved from a first key table, the source identifier, destination identifier, and transmission time stamp;
      inserting the authentication code into the data frame; and
      transmitting the data frame; and
   at the receiving node:
      receiving the data frame;
      retrieving a second key value from a second key table;
      computing a second authentication code using a key value retrieved from a key table, the source identifier, destination identifier, and transmission time stamp; and
      rejecting the data frame if the second authentication code does not correspond to the first authentication code.

2. The method of claim 1, further comprising:
   rejecting the data frame if the transmission time stamp of a first received frame corresponds to the transmission time stamp of a second received frame.

3. The method of claim 1, further comprising:
   computing a transmit time for the received data frame; and
   rejecting the received data frame if the transmit time exceeds a threshold.

4. The method of claim 3, wherein the threshold is based on a transmit time of one or more previously transmitted frames.

5. The method of claim 1, wherein
   the transmitted frame further comprises a destination process identifier; and
   the first and second authentication codes are computed based in part upon the destination process identifier.

6. The method of claim 1, wherein the first authentication code is generated by applying a first hash function using a key value from a key table associated with a port of the transmitting node.

7. The method of claim 1, wherein the data frame includes a data field identifying a source address and a destination address for the transmitted frame.

8. The method of claim 1, wherein the second authentication code is generated by applying a hash function using a key value from a key table associated with a port of the receiving node.

9. The method of claim 1, wherein rejecting the data frame if the second authentication code does not correspond to the first authentication code comprises determining a correlation between the first authentication code and the second authentication code.

10. The method of claim 1 further comprising, determining an elapsed time period between transmission of the frame and receipt of the frame.

11. The method of claim 1, further comprising rejecting the frame if the transmission time of the frame exceeds the transmission time of one more additional received frames by a threshold.

12. The method of claim 1, wherein the first key value is retrieved from the first key table based on a network address of the transmitting node.

13. The method of claim 1, wherein
   the data frame further comprises an association header,
   a portion of the frame used to generate the authentication code comprises at least a portion of the association header, and
   the first key value is selected from the key table using at least a portion of the association header in addition to a source identifier of the frame.

* * * * *

UNITED STATES PATENT AND TRADEMARK OFFICE
CERTIFICATE OF CORRECTION

PATENT NO. : 6,973,568 B2
APPLICATION NO. : 10/945644
DATED : December 6, 2005
INVENTOR(S) : Douglas L. Hagerman It is certified that error appears in the above-identified patent and that said Letters Patent is hereby corrected as shown below:

In column 7, line 64, in Claim 1, insert -- the -- before "destination".

In column 7, line 64, in Claim 1, insert -- the -- before "transmission".

In column 7, line 66, in Claim 1, insert -- first -- before "authentication".

In column 8, line 5, in Claim 1, after "using" delete "a" and insert -- the second --, therefor.

In column 8, line 6, in Claim 1, after "from" delete "a" and insert -- the second --, therefor.

In column 8, line 7, in Claim 1, insert -- the -- before "transmission".

Signed and Sealed this

Eleventh Day of August, 2009

David J. Kappos
*Director of the United States Patent and Trademark Office*